Figure 1:
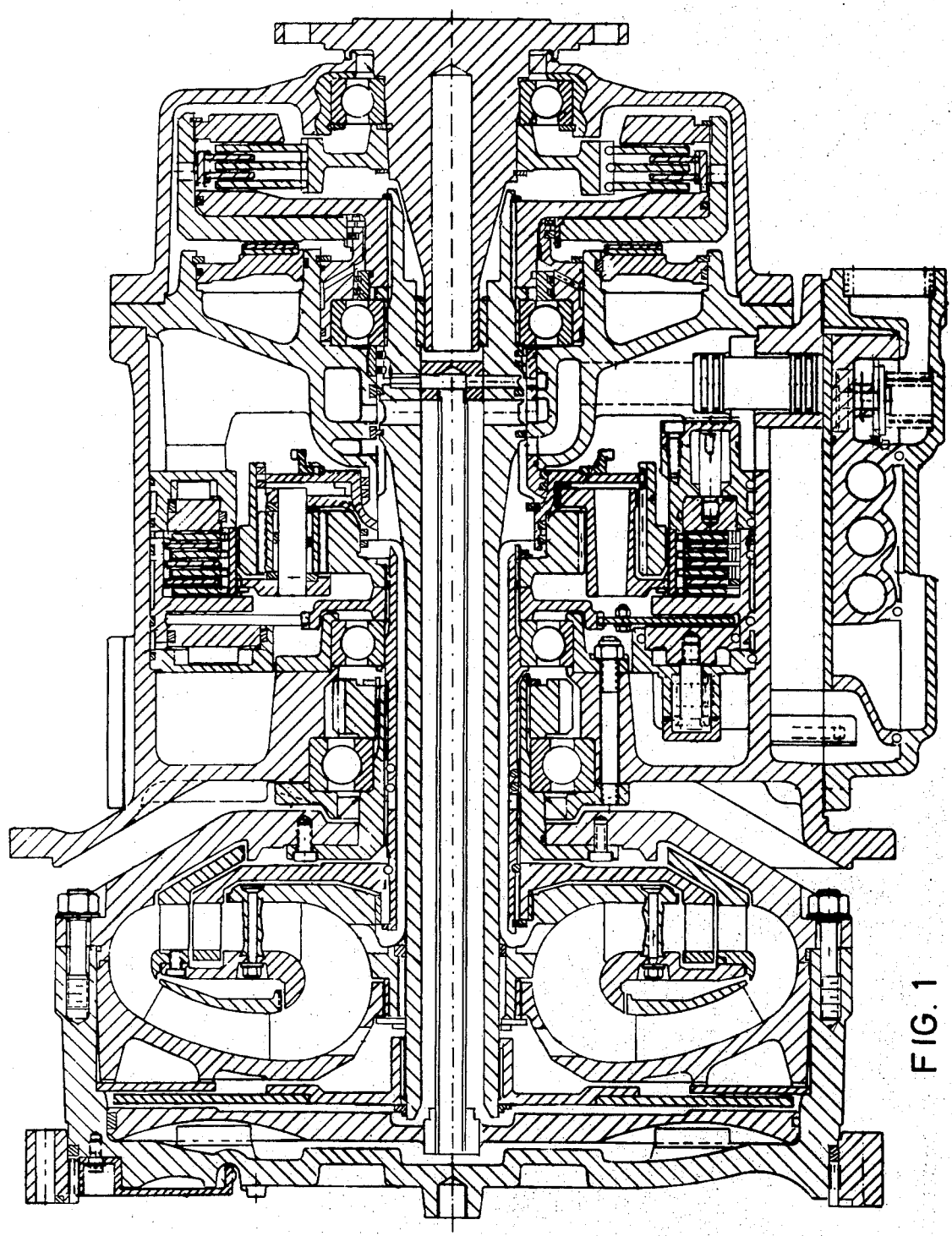

United States Patent [19]
Ahlen

[11] 3,810,640
[45] May 14, 1974

[54] SEALING RING ARRANGEMENT

[75] Inventor: Karl Gustav Ahlen, Stockholm, Sweden

[73] Assignee: S.R.M. Hydromekanik Aktiebolag, Ualingby, Sweden

[22] Filed: Mar. 1, 1972

[21] Appl. No.: 230,596

[30] Foreign Application Priority Data
Mar. 5, 1971  Great Britain.................... 6154/71

[52] U.S. Cl............................. 277/235 A, 277/173
[51] Int. Cl.............................................. F16j 15/28
[58] Field of Search ....... 277/235, 235 A, 236, 193, 277/226, 229

[56] References Cited
UNITED STATES PATENTS
2,518,253  8/1950  Reis ................................ 277/235 A
2,833,264  5/1958  Dailey et al..................... 277/189.5

FOREIGN PATENTS OR APPLICATIONS
930,089  7/1963  Great Britain.................. 277/235 A

*Primary Examiner*—Samuel B. Rothberg
*Assistant Examiner*—Robert I. Smith
*Attorney, Agent, or Firm*—Larson, Taylor and Hinds

[57]  ABSTRACT

A sealing arrangement for forming a seal between inner and outer relatively rotating parts. A sealing ring is mounted in a groove in the inner part and it contacts a cylindrical surface on the outer part. The contacting surfaces of the sealing ring with the outer part and the groove constitute sealing surfaces and at least one of these sealing surfaces is porous and made of material having a low coefficient of friction. The porous and low coefficient of friction material may comprise a layer on either the outer part or the sealing ring or the sealing ring may be made of such material. An example of such a material is molybdenum.

21 Claims, 7 Drawing Figures

SEALING RING ARRANGEMENT

This invention relates to a fluid seal and more particularly to the bearing surfaces in a high pressure oil seal between two members moving in relation to each other, for example, between the parts of a torque converter which rotate in relation to each other.

In one known type of rotating oil seal a cast iron ring, similar to the conventional piston ring used in reciprocating I.C. (internal combustion) engines, is located in a groove provided in a rotatable shaft and the ring bears against a smooth cylindrical, steel surface. However, this type of ring seal is only suitable for use on simple torque converters at limited pressure differences (for oils above S.A.E. 5W) and speeds, if a reasonable length of life is required.

A more advanced type of oil seal often used on large torque converters operating at higher speed and under greater pressure differences includes a bronze ring mounted in grooves accurately ground in the peripheral direction of the surface of a hardened steel shaft and bearing against a cylindrical case-hardened and ground steel surface. This second type of seal has operated successfully at pressure differences of up to 20 kp/cm$^2$, at a peripheral speed of 10 m/sec and, at pressure drops of up to 10 kp/cm$^2$ at a peripheral speed of 20 m/sec. The hardness of the shaft and the cylindrical surface is critical and should be above 60 Rockwell C. A Hardness of 58 Rockwell C, as compared with 60 Rockwell C, leads to a drastic reduction in the life of the seal.

Production difficulties arise from the critical hardness requirements since shafts tend to warp during heat treatment and this is both undesirable in itself and undesirable in so far that the subsequent grinding operation is necessarily difficult and takes long time.

Further, it is necessary to provide a hardened cylindrical steel sleeve, e.g., between the torque converter casing and the shaft and this in turn necessitates the provision of a further seal between the sleeve and the casing.

A further difficulty arising from the inclusion of a sleeve between the casing and the shaft is, that depending on the design of the torque converter, oil is required to flow from a chamber in the casing on one side of the sleeve into a cavity in the shaft. Thus, a sleeve must be machined to provide holes or slots in the sleeve for example between a pair of bronze ring seals, through which oil may flow. In view of the final hardness, structure and assembled position of the sleeve this involves difficulties.

Further, in the past it was necessary, prior to assembly, to cool the steel sleeve and heat the rear cover of a torque converter which was often made of aluminium in order to produce an interference fit sufficient to provide a fit at a temperature up to 170°C. A torque converter operates within a temperature range of − 20°C to + 170°C.

One object of the invention is to provide an oil seal which is capable of withstanding differentiel oil pressures of 20 kp/cm$^2$ for +120°C SAE 5W oil at peripheral speeds corresponding to at least 2,000 rpm. on a 100 mm diameter seal, and in which the surfaces of the groove and the outer seal, in contact with the piston ring do not require heat treatment. In fact, an oil seal according to the present invention reduces the torque loss in a seal and a test run lasting over 1,000 hours has shown that the wear of the surfaces which are most susceptible to wear is reduced to one third compared with the wear taking place in conventional high quality seals.

Thus, the basic problem of the invention was to provide a type of oil seal which is capable of withstanding pressure differences of up to 20 kp/cm$^2$ and speed differences up to 10 − 15 m/sec. without requiring special heat treatments, neither of the grooves nor of the outer race, and which seal at the same time has a sufficient length of life at the above mentioned running conditions for an oil with the SAE 5 viscocity, even if the oil is not quite clean. Thus the seal should not be particularly sensitive to hard particles passing through the seal, and further it should be possible to manufacture the seal at reasonably low costs. Further, the utilization of bronze should be avoided to make the seal less sensitive to sour oils. The above mentioned problems are solved by utilizing surfaces of flame sprayed or flame plated molybdenum or similar, metallic or ceramic, on either the groove or the outer race or preferably on the piston ring. In both cases a normal standard piston ring of steel or preferably cast iron is to be used, which piston ring is either running against the said molybdenum surfaces or the piston is in itself formed with a molybdenum surface. The piston ring shall have a radial lock.

In one embodiment of the invention steel rings are cast into the aluminium casing to provide contact surfaces against the piston ring which is coated with molybdenum. In another embodiment of the invention the molybdenum coated piston ring is engaging aluminium surfaces in the groove, whereby the surfaces of the piston ring, which are contacting the groove are ground, and it is engaging the outer race with a surface that is molybdenum coated but not ground in order to obtain a difference in friction force, and an engagement.

In the following an arrangement of piston ring seals according to the invention will be described by way of examples.

Figure 1B:
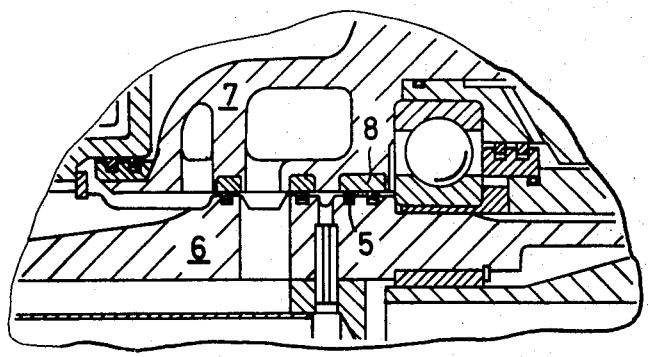
Figure 1A:
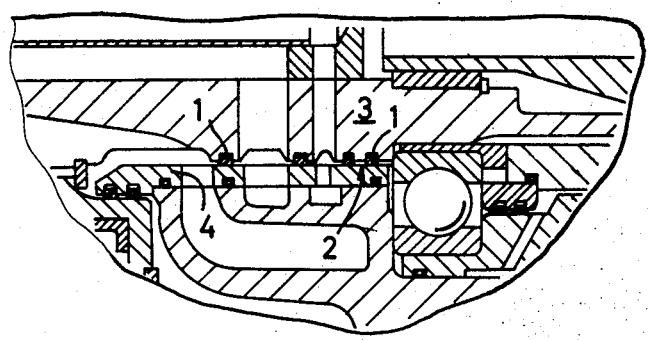

In the drawings FIG. 1 shows an example of an arrangement of piston ring seals in a torque converter and FIGS. 1A and 1B show the lower and upper halves, respectively, of the encircled part of FIG. 1 on a larger scale. FIGS. 2–6 are enlarged diagramatic views showing seals positioned as in FIG. 1B and showing various embodiments thereof according to the invention.

FIG. 1A and the lower half of FIG. 1 show on a hydraulic torque converter a conventional arrangement of the piston ring seals of required quality where the piston rings 1 are of bronze and the outer and inner races 2 and 3 necessarily are heat treated and with a hardness of about 60 Rockwell C. The outer race 2 is formed in a separate sleeve 4.

On the upper half of FIG. 1 and FIG. 1B the piston rings 5 are shown arranged according to the invention, where heat treatment of the surfaces is not necessary and therefore sleeves are omitted.

For comparison it is to be noted that the shaft 6 and the outer race 7 for the seals in FIG. 1B can be used without heat treatment, while in FIG. 1A, the shaft 3 and the outer race 2 have to be heat treated and in some cases require sleeves 4. In FIG. 1B, where there are aluminium parts forming the outer and inner races, steel sleeves or rings 8 have been cast into the aluminium body forming the outer race 7, which together with the seals according to the invention gives a sufficient seal surface quality when machines with a cutting tool both from surface finish and hardness view points.

Figure 2:
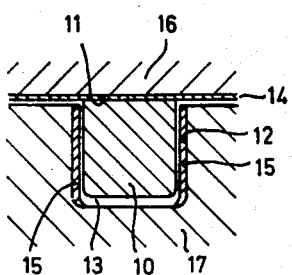

FIG. 2 shows a piston ring seal arranged according to the invention, in which the piston ring 10 is a standard cast iron piston ring with a lock and the outer race surface 11 and the groove sides 12 of the inner race groove 13 are coated with molybdenum 14 and 15 respectively and thereafter the surfaces ground. The material in the outer race 16 and in the inner race 17 may be of aluminium, steel or cast iron.

Figure 3:
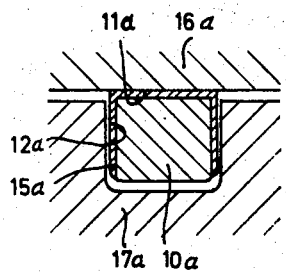

FIG. 3 shows a piston ring seal according to the invention, in which a steel or cast iron piston ring 10a is coated with molybdenum 15a and ground and in which the inner race 17a and the outer race 16a are steel with a hardness only preferably above 250 HBr., and further in which the groove sides 12a and outer race surface 11a are not necessarily ground.

Figure 4:
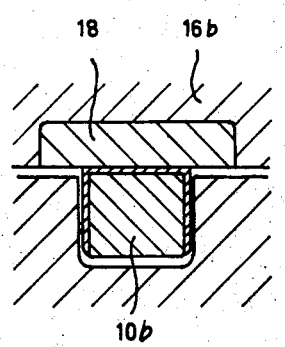

FIG. 4 shows a piston ring seal of the same type as in FIG. 3, but in which a steel ring 18 is cast into the outer race 16b which is made of aluminium. After machining the steel surface will give a sufficiently good sealing surface, and no heat treating of the surface is necessary.

Figure 5:
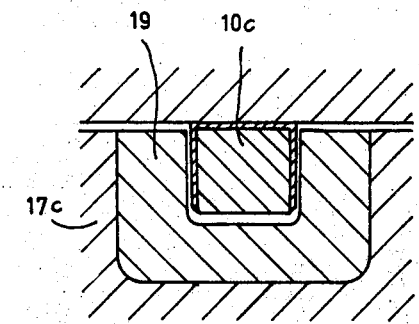

The piston ring seal shown in FIG. 5 is also of the same type as in FIG. 3, but in this embodiment a steel ring 19 is cast into the inner race 17c which is made of aluminium, and also in this embodiment the steel surface will give a sufficient good sealing surface after machining, and no heat treating is necessary.

Figure 6:
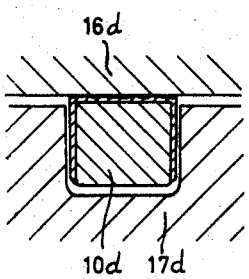

FIG. 6 shows the same type of piston ring seal as in FIG. 3 in which both the outer surface and the side surfaces of the piston ring 10d are coated with molybdenum but in which the molybdenum coated outer surface of the piston ring is unground while the side surfaces are ground. This kind of seal has a slightly larger leakage than the piston ring according to FIG. 3, where both the sides and the outer cylindrical surface of the piston ring are ground. However, this piston ring arrangement acts satisfactorily at given conditions, even if the outer and inner races 16d and 17d are of normal steel, not heat treated, and in case the inner and/or outer race are made of aluminium, it still acts satisfactorily but only up to a pressure difference of 6 kp/cm².

Except for the seal where the molybdenum coated piston ring 10d is running directly against the aluminium body of the outer and inner races 16d and 17d the new seals according to the invention can withstand pressure differences of up to 20 kp/cm² for a differential speed of up to 15 m/s and also with rather thin oils such as SAE 5W at temperatures above 100°C. In the case where the molybdenum coated and ground piston ring is running directly against aluminium outer and inner races the seal will only be good for up to 8 – 10 m/s and for pressure differences preferably only of 6 – 8 kp/cm² or 10 kp/cm² at the maximum. The use of the piston ring seal system according to the invention obviously results in a heavy reduction of manufacturing costs and also in an increase of the quality of the torque converter.

It can easily be recognized that the elimination of the heat treatment and the grinding process in the first hand allows the utilization of a cheaper steel quality, and the passage of time of the pieces through the shop will be reduced at the same time as the manufacturing costs will be lowered.

In case of for instance simple torque converters, where only low oil pressure differences are used the molybdenum coated piston rings can be allowed to run directly against the aluminium surfaces at pressure differences up to 6 – 10 kp/cm² and at a differential speed of up to 8 – 10 m/s, where cast iron sleeves were previously necessary.

The reason, why the above mentioned good result has been obtained, is not only the well-known molybdenum characteristic of giving a low friction coefficient but also the fact that the oil is steadily passing through the molybdenum coated surface due to its porosity, as a result of which there is in fact no metallic contact during the running since a film is developed which will carry the ring, which is suitable for the types of sealings in question, where the oil viscocity is fairly low and a certain leakage is both allowable and wanted. The molybdenum low friction coefficient is primarily utilized by starting of the seal from still stand and at such a low differential speed between the shafts that the oil film has not yet developed.

Even if the molybdenum coating seems to be the most advantageous coating layer on the seal surfaces, the coating may also be made by the same process but with other metals such as bronze alloys, different kinds of molybdenum alloys and even chrome or nickel and copper as long as the material when applied is porous. A variant of the invention is to make the complete piston ring of for instance sintered material of molybdenum or bronze or molybdenum alloys.

What we claim is:

1. In a device including an inner rotating part which rotates in and relative to an outer part and which remains in the same axial position relative to the outer part, a sealing ring arrangement for forming a seal between said inner and outer parts in which a sealing ring is mounted in a groove in the inner part and contacts a cylindrical surface on the outer part, the contacting surfaces of the sealing ring with the outer part and of the sealing ring with the groove constituting sealing surfaces, said device including means forming a fluid pressure differential axially across said sealing ring, at least one contacting surface of at least one of said sealing surfaces being sufficiently porous to permit a limited flow of fluid to pass therethrough due to said pressure differential thereacross and said sealing surfaces made of a material having a low coefficient of friction.

2. The invention according to claim 1 wherein said at least one contacting surface is coated with a porous layer of said material having a low coefficient of friction.

3. The invention according to claim 2, wherein the coating is made of molybdenum, which is flame sprayed or flame plated onto the at least one sealing surface.

4. The invention according to claim 1, wherein the sealing ring includes flat side surfaces perpendicular to the axis of relative rotation, said flat sides along being porous and formed of a material having a low coefficient of friction, and said flat porous surfaces being ground.

5. The invention according to claim 4, the outer cylindrical surface of the sealing ring being unground and wherein both of said inner and outer parts are of aluminum.

6. The invention according to claim 1, in which the said at least one porous surface is on the sealing ring and is ground and wherein at least one of the facing surfaces of the inner and outer parts, in the vicinity of the contacting sealing surfaces, is made of steel and is machined.

7. The invention according to claim 1, wherein at least one of said inner and outer parts is aluminum and including at least one hard insert cast into one of said aluminum parts in position to constitute at least one of said contacting sealing surfaces.

8. The invention according to claim 1, wherein said inner and outer parts are a turbine shaft and a part of the stationary casing, respectively, in a hydraulic torque converter of the type in which fluid is delivered to and from the converter, the said at least one porous sealing surface of the sealing ring sealing between steel surfaces of said inner and outer parts.

9. The invention according to claim 1, wherein said inner and outer parts are a turbine shaft and a part of the rotating casing, respectively, in a hydraulic torque converter, of the type in which fluid is delivered to and from the converter, the said at least one porous sealing surface of the sealing ring sealing between steel surfaces of said inner and outer parts.

10. The invention according to claim 1, in which at least the outer surface of the sealing ring is porous and it seals against a relatively rotating part, and wherein the porosity of the porous part is such as to permit a limited flow of oil in the axial direction from one side of the sealing ring to the other due to differential pressure.

11. The invention according to claim 1, wherein said material is molybdenum.

12. The invention according to claim 1, wherein said material is a sintered material.

13. The invention according to claim 11, wherein said porous material is flame sprayed onto its respective contacting surface.

14. The invention according to claim 1, wherein said porous material is flame coated onto its respective contacting surface.

15. The invention according to claim 1, wherein the sealing ring is flame coated with said porous material on its circumferential outer surface and on the radial side surfaces of the ring, the porous material on the side surfaces being ground.

16. The invention according to claim 15, wherein the flame coated porous material on the circumferential outer surface of the sealing ring is unground.

17. The invention according to claim 16, wherein said outer part is aluminum.

18. The invention according to claim 11, wherein the said porous contacting surface is on the sealing ring, and the other contacting surface engaged by the porous surface is machined with a cutting tool without heat treatment of said surface.

19. The invention of claim 18, said machined surface being on the inner rotating part.

20. The invention according to claim 18, said machined surface being on the outer rotating part.

21. The invention according to claim 18, said machined surface being made of steel.

* * * * *